United States Patent [19]

Seguin

[11] 4,413,916
[45] Nov. 8, 1983

[54] POWER METER FOR LASERS

[75] Inventor: Herb J. J. Seguin, Edmonton, Canada

[73] Assignee: Majestic Contractors Limited, Edmonton, Canada

[21] Appl. No.: 360,836

[22] Filed: Mar. 23, 1982

[51] Int. Cl.³ .................... G01J 5/02; G01K 17/00
[52] U.S. Cl. .................................................. 374/32
[58] Field of Search ...................... 374/32; 250/352

[56] References Cited

U.S. PATENT DOCUMENTS

| | | | |
|---|---|---|---|
| 3,464,267 | 9/1969 | Ehrlich et al. | 374/32 |
| 3,918,303 | 11/1975 | Zakhidov et al. | 374/32 |
| 4,037,470 | 7/1977 | Mock et al. | 374/32 |
| 4,301,680 | 11/1981 | Lunev et al. | 374/32 |

OTHER PUBLICATIONS

Emmony et al., "An absolute calorimeter for the measurement of $CO_2$ laser power" in Journal of Physics E, vol. 9, #8, 8/76, pp. 621-622.

*Primary Examiner*—Herbert Goldstein
*Attorney, Agent, or Firm*—Sim & McBurney

[57] ABSTRACT

There is provided a method and apparatus for determining the power output of a laser for wavelengths which are substantially fully absorbed by water, such as the wavelengths produced by carbon dioxide lasers. A rotary member defines a surface of revolution which widens away from an opening to a free edge, with the opening being located substantially at the axis of the surface. Means are provided for rotating a member about its axis, and water is brought to the surface through the opening, to form a film running to the free edge. Means are provided for collecting water at the free edge, and the water through-put is measured by suitable means. Further means are provided for measuring the water temperature differential arising due to absorbable radiation falling upon the water as it runs over the surface, and on the basis of the throughput and the temperature differential, the absorbed power, and hence the output of the laser in the wavelength region in question, can be calculated. For $CO_2$ lasers substantially all of the radiation is in the region which is fully absorbed by water, and thus the apparatus and method provided herein are ideal for measuring the power output of lasers of this kind.

14 Claims, 3 Drawing Figures

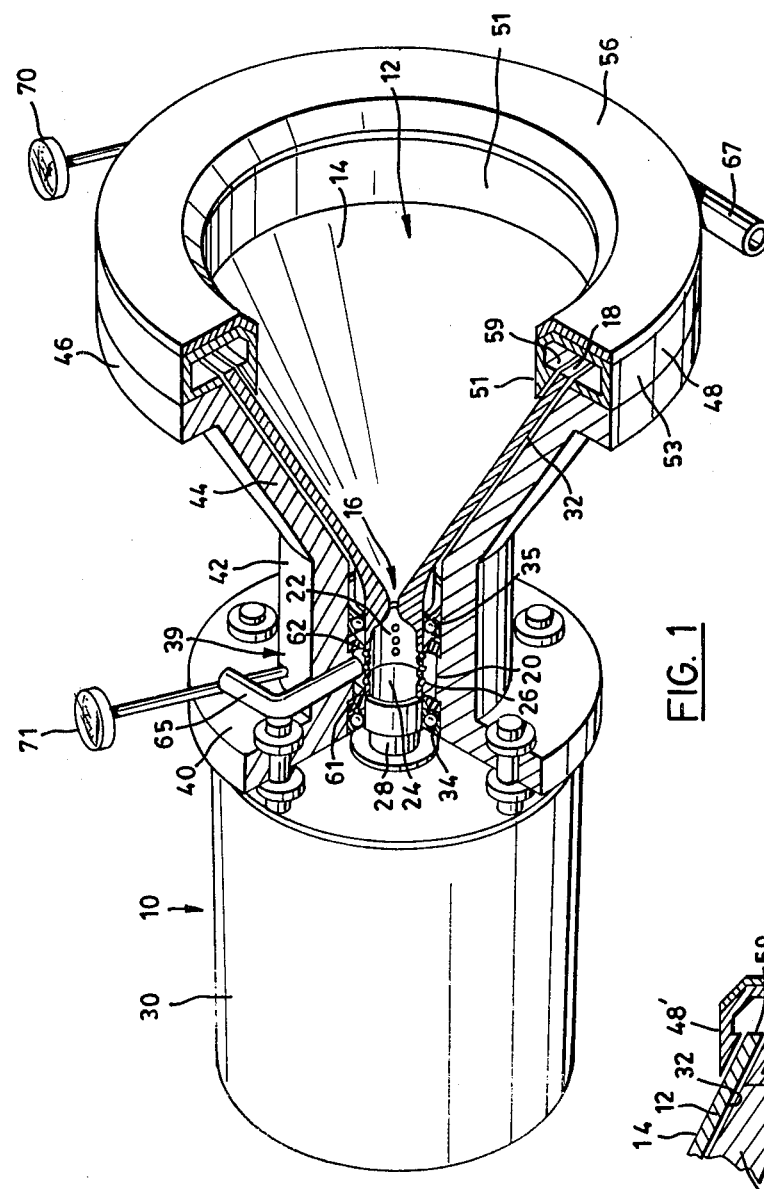
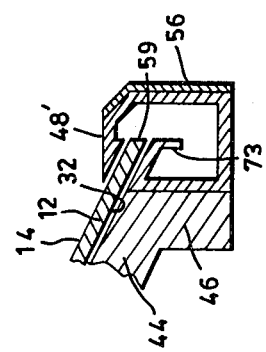
FIG. 1
FIG. 2

POWER METER FOR LASERS

This invention relates generally to laser technology and has to do particularly with a new type of power meter designed to provide an accurate measurement of the power output of a laser in those wavelengths which are substantially fully absorbed by a rapidly moving fluid film.

BACKGROUND OF THIS INVENTION

The wave length of the light produced by a laser depends upon the nature of the materials utilized by the laser to produce its radiation. For example, Helium-Neon lasers produce a single wavelength near the lower end of the visible spectrum. An Argon laser is capable of producing a number of wavelengths, most of which are in the visible portion of the spectrum. By contrast, carbon dioxide lasers (i.e. lasers which utilize a mixture of gases including carbon dioxide, and in which vibratory changes in the carbon dioxide molecule are responsible for the generation of the radiation) produce an emission having a wavelength longer than the wavelengths of the visible spectrum. Hence, the radiation from a carbon dioxide laser is in the infra-red region, and is invisible to the eye.

Recent developments in laser technology have allowed the construction of carbon dioxide lasers capable of a power output in the range of 20,000 kilowatts and up. A typical construction produces a beam (prior to focusing) which may have a diameter of 2 inches to 4 inches. It is important to be able to measure the actual power output in such a beam relatively accurately.

The accurate measurement of C.W. laser power of a few hundred watts, up to about 1 kw, is today relatively straight-forward, since several optical power meters are now available commercially in this power range. However, similar measurements at the multi-kilowatt to tens of kilowatt level are still complicated by the fact that no power meters for this power range can yet be purchased. The literature has described several approaches to the construction of optical power meters suitable for this purpose (1–5); but most have been far less convenient to use than the corresponding lower power commercial units. In an attempt to overcome this deficiency a new type of high level optical power meter has been developed which is not only simple and inexpensive to build, but in addition, does not require calibration.

Although several different methods have been proposed and attempted in the prior art, experience has shown that in the design of power meters, for any wavelength range, it is highly desirable to utilize a calorimeter type geometry so that the difficult problems of initial calibration, and subsequent degradation, can be avoided. In the microwave portion of the EM spectrum such techniques have long been commonplace, since the early development of precision water loads for rectangular and circular waveguide. There a flowing water cone or wedge was utilized to provide a near reflectionless impedance match to the radiation source; thereby providing a convenient and absolute method for measurement of high average EM power (6).

A somewhat similar approach was used in the design of a "circulating liquid" calorimeter for the detection of high power pulsed laser signals (7). The absorbing liquid wedge structure of reference (7) is however, not appropriate to many types of lasers, including $CO_2$ lasers, because the walls of the liquid containment vessel are not compatible with the emission spectrum. Although in principle one can envisage a liquid containment vessel made from an IR transmitting material such as ZnSe, the concept is still not practical for a high level power meter. Not only would a ZnSe enclosed water wedge be prohibitively expensive, but experiments have shown that the presence of containment vessel walls in a high average power $CO_2$ laser calorimeter introduce inconsistency and error into the measurements. Moreover, the use of a containment surface of any kind severely restricts the power handling capacity of the device.

WINDOWLESS FLUID ABSORBERS

The radiation produced by a carbon dioxide laser of the kind just defined is substantially fully absorbed by water. Indeed, when such radiation falls upon a layer or body of water, almost all of the absorbtion takes place within the first 1/10th millimeter or so, and it is therefore not necessary to provide any appreciable thickness of the water body in order to accomplish substantially complete absorbtion of this radiation. An attempt to exploit this phenomenon to overcome the containment vessel difficulty by the use of free flowing surface water films has been described in the literature (8). This approach appears satisfactorily for power measurements up to a few hundred watts, but above this level the intense C.W. laser beams are found to disturb and displace the thin surface water film flow, leading to serious errors and often a sudden catastrophic failure of the device itself.

It is therefore an aspect of this invention to provide a windowless power meter for lasers, and in particular for laser wavelengths which are substantially fully absorbed by water, and which is capable of measuring large power outputs without danger of burn-out.

Accordingly this invention provides a new approach to the utilization of an absorbing water film for high powered C.W. infrared lasers. Here a rapidly spinning disc or cone is used to generate a stable and windowless free water surface suitable for complete absorption of intense laser beams. The design of the sensor head is such that only a very thin film of rapidly flowing water is used. In this manner, the thermal mass of the device is kept low, thereby giving fast response and very large dynamic range. The same spinning sensor head can be used for precision power measurements, from a power level of a few watts all the way up to tens of kilowatts, simply by adjustment of the cooling water flow rate.

Stated simply, this invention proposes to feed a stream of water axially down a rapidly rotating hollow shaft, whose shape gradually flares or widens out to define a surface along which, at a sufficiently high rpm (typically 4000), the centrifugal forces spread the water flow out into a very thin and uniform film. This water film moves with high velocity in both axial and radial directions over the surface, and then spills out tangentially over its edge. In this manner a fast-flowing, thin, absorbing water film is generated, which because of its high circumferential velocity, is exceptionally stable against external pressures. The film flow and uniformity are unaffected by intense laser beams, and can even resist strong mechanical surface pressure due to a pseudo water ski effect. The technique of laser power measurement is thus simply reduced to recording the water temperature differential between inlet and outlet.

GENERAL DESCRIPTION OF THE INVENTION

Accordingly, this invention provides an apparatus for determining the power output of a laser for wavelengths which are substantially fully absorbed by water. The apparatus includes a rotary member defining a surface of revolution which widens away from an opening to a free edge, the opening being located substantially at the axis of the surface. Means are provided for rotating the member about the axis of the surface of revolution, and further means are provided for bringing water to the surface through the opening. Additional means are provided for collecting water at the free edge, and still further means are provided for measuring the through-put of water through the apparatus. Finally, means are provided for measuring the water temperature differential arising due to the absorbable radiation falling upon the water as it runs over the surface.

This invention further provides a method for determining the power output of a laser for wavelengths which are substantially fully absorbed by water. The method utilizes a device which includes a rotary member defining a surface of revolution which widens away from an opening to a free edge, the opening being located substantially at the axis of the surface. The method includes flowing water in a film over the surface from the opening to the free edge while rotating the rotary member. The water flow through the device is measured while radiation from the laser is caused to fall upon the water film. A measurement is made of the temperature differential in the water arising due to the radiation being absorbed by the water, and then the power output of the laser can be calculated on the basis of the flow quantity and the temperature differential quantity which have been determined.

GENERAL DESCRIPTION OF THE DRAWINGS

Two embodiments of this invention are illustrated in the accompanying drawings, in which like numerals denote like parts throughout the several views, and in which:

FIG. 1 is a partially sectioned perspective view of the first embodiment of an apparatus adapted to measure the power output of a laser;

FIG. 2 is an axial sectional view through a portion of a second embodiment; and

DETAILED DESCRIPTION OF THE DRAWINGS

Figure 3:
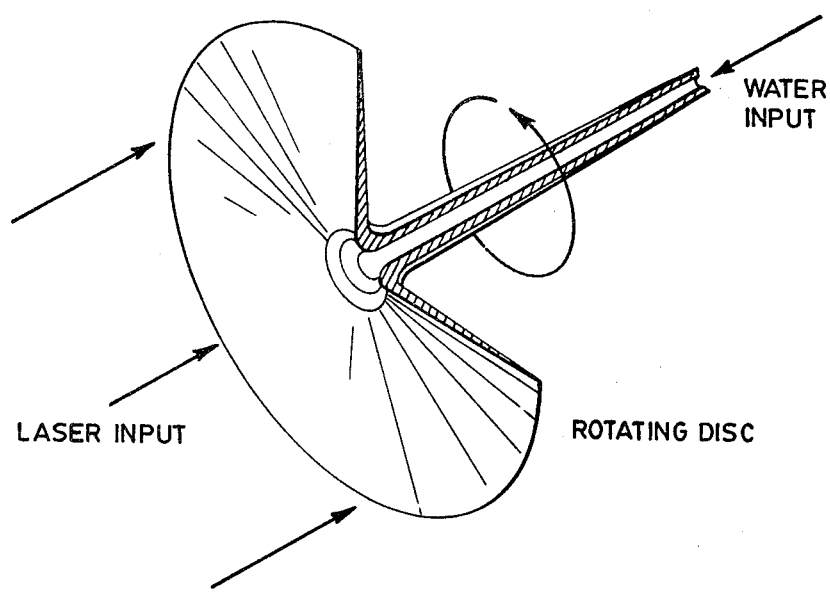
FIG. 3 is a perspective view of two spinning surface geometries which can be utilized with this invention.
Figure 3:
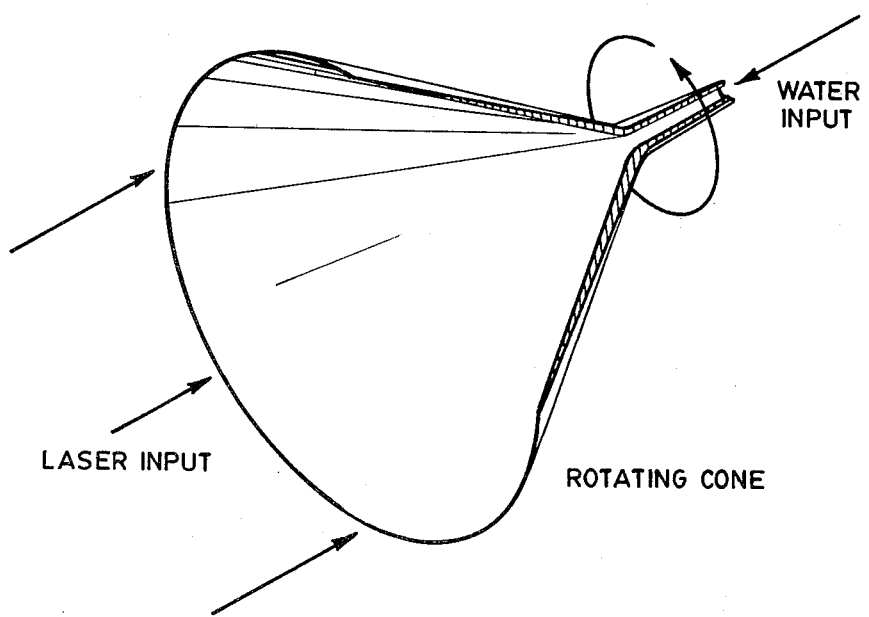

Attention is first directed to FIG. 1 in which an apparatus 10 is shown for determining the power output of a laser for wavelengths which are substantially fully absorbed by water. The apparatus includes a rotary member 12 which defines an inside surface of revolution 14 that diverges away from a central, axial opening 16 to a free edge 18. More specifically, the inside surface of revolution 14 is a cone having a cone angle (between the surface and the cone axis) of 45° up to approximately 90° (the latter being a flat disc). The rotary member 12 includes an axially symmetrical portion 20 adjacent the opening 16 and extending away from the conical inside surface 14. As can be seen in FIG. 1, the axially symmetrical portion 20 is conical in the embodiment illustrated, and contains an inner chamber 22 which is in communication with the opening 16. The inner chamber 22 has a rearward wall 24, and cylindrical side walls through which a plurality of passageways 26 open. The passageways 26 may, as in the embodiment illustrated in FIG. 1, be provided as three axial rows of three openings each, separated around the chamber 22 by a 120° spacing. At the rearward or leftward end of the projection 20 is a blind, threaded bore (not illustrated) which is engaged by the shaft 28 of a high speed motor 30, capable or rotary speeds in the range from 4000 rpm to 10,000 rpm.

Turning to the rotary member 12 again, it will be seen that this includes a conical outside surface 32 congruent with the conical inside surface 14, thus defining a conical wall of uniform thickness. The rotary member 12 is supported for rotation on two sets of bearings 34 and 35, the latter being braced from a frame member 39 which includes a flange 40 to which the motor 30 is secured, a conical portion 42 which has a central passageway within which the bearings 34 and 35 are mounted, and a flaring or conical portion 34 which lies alongside and which is closely spaced from the outer surface 32 of the rotary member 12. The portion 44 terminates in an outward flange 46 to which is connnected a trough member 48.

The trough member constitutes means for collecting water at the free edge 18, and can be seen to have a C-configuration, such that it fully surrounds the free edge 18, without touching the rotary member 12. More particularly, the trough member 48 has a cylindrical inside surface 51, a cylindrical outside surface 53, a planar forward surface, and a planar rearward surface. The rearward surface is the surface by which the trough member 48 is secured to the flange 46, while the forward planar surface of the trough member 48 has affixed to it a cladding 56 which can be of a highly polished metal adapted to reflect and not to absorb any laser radiation which may inadvertently fall thereagainst. Within the trough member 48 is a cavity 59 which is somewhat elongated in radial axial section as can be seen in FIG. 1. The conical inside surface 51 is disposed so that it overlaps or overlies the conical inside surface 14 of the rotary member 12.

Attention is now directed to the cylindrical portion 42 of the frame member 39. Located between the two sets of bearings 34 and 35 are two flexible annular seals 61 and 62. The flexible annular seals 61 and 62 are adhered or otherwise secured to the inside surface of the cylindrical portion 39 in a water tight manner, and each seal has a thinner lip portion extending obliquely inwardly towards the other seal and resting resiliently against the outside surface of the cylindrical projection 20 of the rotary member 12. Thus, there is defined an annular chamber between the cylindrical projection 20, the inside of the cylindrical portion 42 and the two seals 61 and 62. As can be seen in FIG. 1, the passageways 26 are located so as to open between the seals 61 and 62, which means that the inner chamber 22 and the annular chamber just defined are in communication through the passageways 26.

A conduit 65 extends through the portion 42 of the stationary frame member 39, and is adapted to allow pressurized water to be passed to the annular chamber located between the seals 61 and 62. From the annular chamber, the water can pass through the passageways 26 into the inner chamber 22 thence through the opening 16 and onto the inner surface 14. By rotating the rotary member 12 at a relatively high speed, for example in the range of 4000 to 10,000 rpm, it can be ensured that the water passing through the opening 16 will be distributed uniformly as a flowing film over the inside surface 14, the water moving to the free edge 14 at which point it is flung outwardly into the trough member 48 and collected. The trough member 48 includes a tangential outlet pipe 67 through which collected water can be tapped off on a continuous basis.

In order to measure the temperature differential in the water passing through the device, arising due to the incidence of laser radiation against the water film on the inside surface 14, two thermometric devices 70 and 71 can be provided. The thermometric device 70 has its sensor end in communication with the chamber inside the trough member 48, while the thermometric device 71 has its sensor end located within the annular chamber defined between the two seals 61 and 62. It will be appreciated that other temperature-sensing devices, (for example, semi-conductor sensors) could be utilized in place of those illustrated in FIG. 1.

Conventional means can be provided for measuring the flow of water through the device on the basis of weight per unit time. For example, the output along the conduit 67 can simply be dumped into a bucket located on a weigh scale, and the increase in weight of the bucket as it fills up with water can be established for a given lapse of time. From this, the flow rate of the water can be determined.

Once the flow rate and the temperature differential are known, it is a simple matter to utilize these quantities together with the known specific heat characteristics of water, to calculate the power which the water has absorbed.

Attention is now directed to FIG. 2, which shows the second embodiment of the invention to differ from the first embodiment only in the construction of the trough member 48'. The trough member 48' in FIG. 2 is adapted to enclose the free edge 59 of the conical member 12, as in the first embodiment, but additionally has a re-entrant lip portion 73 outwardly adjacent the outside surface 32 of the rotary member 12 and in alignment with the free edge 59. The re-entrant lip portion 73 ensures the complete capture of water passing outwardly from the free edge 59 and restricts leakage of water between the conical outside surface 32 and the trough member 48'.

In the present invention, the inside surfaces of the cone are not blackened but instead are left reflecting, so that absorption of laser radiation is restricted essentially to the water film. Experiment has shown that at a moderate (4000) rpm, the generated surface film flow is sufficiently rapid yet laminar to provide thermal isolation for the metallic spinning cone surface; thus, the effective thermal mass of the device is essentially only that of the thin water film itself. This feature gives the sensor heat a relatively fast response (1 sec.) at either low or elevated power levels. Also, since ordinary tap water is used as the absorbing fluid the device is simple to use and requires no calibration.

While specific embodiments of this invention have been illustrated in the drawings and described hereinabove, those skilled in the art will appreciate that changes and modifications may be made therein, without departing from the essence of this invention, as set forth in the appended claims.

REFERENCES

1. E. K. Damon and J. F. Flynn, Appl. Optics, Vol. 2, pp 163 (1963)
2. B. F. Scott, Jour. Sci. Instrum., Vol. 43, pp 685 (1966)
3. J. R. Wilson, J. Phys. E., Sci. Instrum. Vol. 2, pp 215 (1969)
4. R. A. Chodzko, S. B. Mason, R. R. Giedt and D. A. Durran, "Variable aperture calorimeter for an unstable resonator", Appl. Optics, Vol. 15, No. 10, pp 2367-2371, October (1976)
5. R. L. Smith, T. W. Russell, W. E. Case, and A. L. Rasmussen, IEEE Trans. Instrum. Meas. 1M-21, pp 434 (1972)
6. Waveguide
7. Circulated-liquid calorimeter for the detection of high power and high energy pulsed laser signals. G. A. Fisk and A. Gusinow, Rev. Sci. Instrum., Vol. 48, No. 2, pp 118-121 February (1977)
8. An absolute calorimeter for the measurement of $CO_2$ laser power. D. C. Emmory and J. G. S. Bunn, Jour. Phys. E., Scientific Instrum., Vol. 9, pp 621-2, April (1976)
9. W. W. Coblentz, "Investigations of Infrared Spectra", Washington,: Carnegie Institution (1905)
10. 1 KW Coherent Radiation, $CO_2$ laser power meter model 130

I claim:

1. Apparatus for determining the power output of a laser for wavelengths which are substantially fully absorbed by water, comprising:
a rotary member defining a surface of revolution which widens away from an opening to a free edge, the opening being located substantially at the axis of said surface,
first means for rotating said member about said axis,
second means for bringing water to said surface through said opening,
third means for collecting water at said free edge,
fourth means for measuring the throughput of water through the apparatus,
and fifth means for measuring the water temperature differential arising due to absorbable radiation falling upon the water as it runs over saidsurface.

2. The apparatus claimed in claim 1, in which said first means is adapted to rotate said rotary member at a speed in the range from about 4000 to about 10,000 rpm.

3. The apparatus claimed in claim 1, in which the third means comprises a stationary annular collecting trough adjacent said free edge, the trough having an outlet for collected water, the trough defining an access aperture through which laser radiation can fall on a water layer on said surface of revolution.

4. The apparatus claimed in claim 1, claim 2 or claim 3, in which said surface is a conical inside surface, the rotary member having an axially symetrical portion adjacent the said opening and extending away from the conical inside surface, said portion containing an inner chamber communicating with said opening, the apparatus including a stationary means defining an annular chamber through which said portion extends, and passageway means through said portion by which the two said chambers are in communication, said second means including conduit means for providing pressurized water to said annular chamber.

5. The apparatus claimed in claim 3, in which the collecting trough outlet is tangential and in the direction of water rotation within the trough.

6. The apparatus claimed in claim 3, in which the trough wraps fully around said free edge, to eliminate splashing.

7. The apparatus claimed in claim 3, in which the rotary member has a conical inside surface, and a conical outside surface at least adjacent said free edge, and in which the trough wraps fully around the free edge to eliminate splashing and further has a re-entrant portion outwardly adjacent said conical outside surface in alignment with the free edge, to permit full capture of water and restrict leakage of water between the conical outside surface and the trough.

8. The apparatus claimed in claim 3, in which the fifth means includes thermometer devices installed in the collecting trough and in the said annular chamber.

9. Apparatus for determining the power output of a laser for wavelengths which are substantially fully absorbed by water, when used with means for measuring water flow, the apparatus comprising:
- a rotary member defining a surface of revolution which diverges away from an opening to a free edge, the opening being located substantially at the axis of said surface,
- first means for rotating said member about said axis,
- second means for bringing water to said surface through said opening,
- third means for collecting water at said free edge, and
- fourth means for measuring the water temperature differential arising due to absorbable radiation falling upon the water as it runs over said surface.

10. The apparatus claimed in claim 1 or in claim 9, in which the surface is an inside conical surface.

11. A method of determining the power output of a laser for wavelengths which are substantially fully absorbed by water, utilizing a device including a rotary member defining a surface of revolution which widens away from an opening to a free edge, the opening being located substantially at the axis of said surface, the method including the operations of:
- (a) flowing a water film over said surface from said opening to said free edge while rotating said rotary member,
- (b) measuring the flow of water through the device,
- (c) causing radiation from the laser to fall upon the water film,
- (d) measuring the temperature differential in the water arising due to the radiation being absorbed by the water, and
- (e) determining the power output on the basis of the quantities measured in steps (b) and (d).

12. The method claimed in claim 11, in which the steps (a) to (d) are carried out simultaneously.

13. The method claimed in claim 11, in which the said surface is an inside conical surface.

14. The method claimed in claim 11, claim 12 or claim 13, in which the laser radiation falls substantially axially upon the water film.

* * * * *